United States Patent [19]

Shimano

[11] 4,410,313
[45] Oct. 18, 1983

[54] REAR DERAILLEUR FOR A BICYCLE

[75] Inventor: Keizo Shimano, Sakai, Japan

[73] Assignee: Shimano Industrial Company Limited, Osaka, Japan

[21] Appl. No.: 240,008

[22] Filed: Mar. 3, 1981

[30] Foreign Application Priority Data

Mar. 14, 1980 [JP] Japan .............................. 55-34097[U]

[51] Int. Cl.³ .......................................... F16H 11/00
[52] U.S. Cl. ...................................... 474/82; 474/134
[58] Field of Search ..................... 474/82, 80, 78, 133, 474/134, 135

[56] References Cited

U.S. PATENT DOCUMENTS 3,960,025 6/1976 Hippolyte Juy ...................... 474/82
4,198,874 4/1980 Nagano et al. ........................ 474/82

FOREIGN PATENT DOCUMENTS 271024 9/1950 Fed. Rep. of Germany ........ 474/80
309519 7/1933 Italy ..................................... 474/80

Primary Examiner—Lawrence J. Staab
Assistant Examiner—Michael D. Bednarek
Attorney, Agent, or Firm—Stevens, Davis, Miller & Mosher

[57] ABSTRACT

A rear derailleur for a bicycle, which comprises a derailleur body and a changeover frame having a guide pulley and a tension pulley, and guard plates for preventing a driving chain from escaping meshing with each pulley. The front edge of the guard plate corresponding to the tension pulley is positioned radially inwardly from the outer periphery of the tension pulley and close to the center thereof, and a pulley cap is interposed between the tension pulley and the guard plate.

5 Claims, 4 Drawing Figures

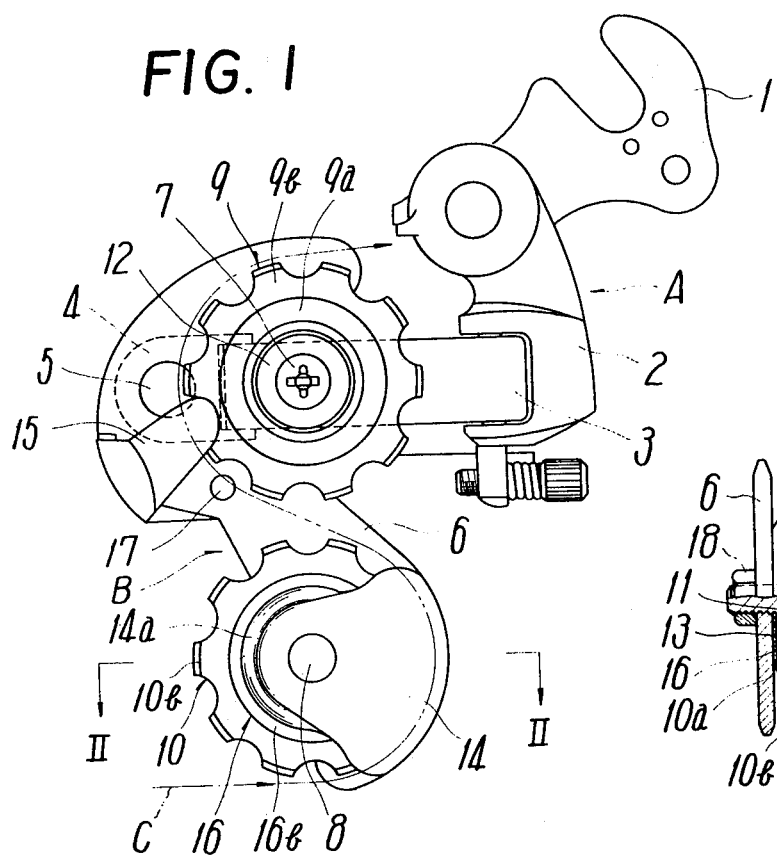
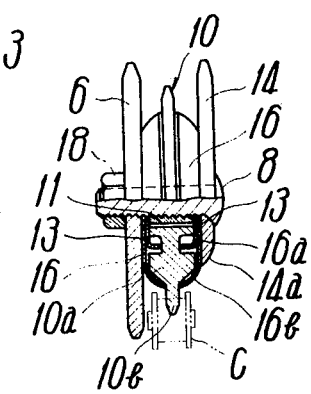
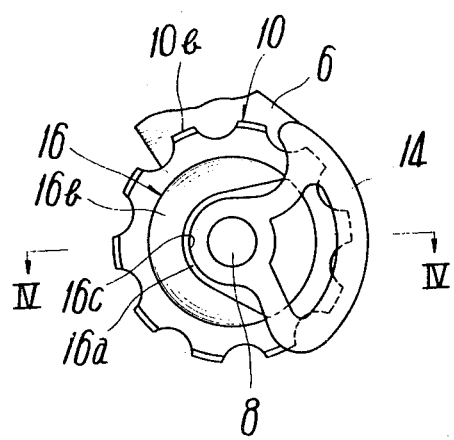
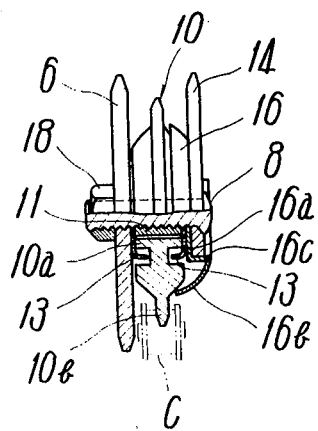

REAR DERAILLEUR FOR A BICYCLE

FIELD OF THE INVENTION

This invention relates to a rear derailleur for a bicycle, and more particularly to a rear derailleur which switches a driving chain to a desired one of multistage sprockets at a rear wheel of the bicycle.

BACKGROUND OF THE INVENTION

Generally, a rear derailleur for a bicycle, comprises a main body provided with a base member supported to a hub shaft at a rear wheel; a movable member movable axially of multistage sprockets with respect to the base member; and a changeover frame provided with a pulley plate swingably supported to the movable member. A guide pulley and a tension pulley are supported rotatably to the pulley plate. The changeover frame together with the movable member move axially of the sprockets, so that a driving chain in mesh with each pulley can be switched to a desired sprocket.

The changeover frame has a guard plate provided axially outwardly of and opposite to each pulley to thereby prevent the chain from escaping therefrom.

The guard plate at the rear derailleur which is mounted on a hub shaft of a rear wheel corresponding to the sprockets, is opposite at the outer surface to spokes of the rear wheel. In a case where the front edge of the guard plate, in the forward rotating direction of the rear wheel is open with respect to the tension pulley and a gap larger than the diameter of a spoke is formed between the guard plate and the tension pulley, the following problem is created.

Since the low speed sprocket is positioned in close proximity to the spokes of the rear wheel, when the chain is over-shifted more than required, or switched by the derailleur supported to a fork end of the bicycle frame deformed by an accident where the bicycle is dropped, the spokes of the rear wheel when rotating enter the gap between the guard plate and the tension pulley. As a result, the spokes break or an emergency braking on the rear wheel may cause the bicycle to fall.

SUMMARY OF THE INVENTION

An object of the invention is to provide a rear derailleur for a bicycle, which never catches the spokes of the rear wheel in a gap between the guard plate and the tension pulley even when the chain is by mistake over-shifted past a low speed sprocket, or switched thereto through a derailleur supported to the bicycle's fork end deformed by an accident, such as when the bicycle falls.

In detail, the rear derailleur of the invention has a guard plate opposite to the tension pulley, and the front edge of the guard plate in the forward rotating direction of the rear wheel is positioned radially inwardly from the outer periphery of the tension pulley and close to the center thereof. A pulley cap is interposed between the guard plate and the tension pulley to cover the lateral side of the latter, and has an extension extending from the front edge of the guard plate radially outwardly of the tension pulley and then bending along the lateral side thereof, the extension being positioned in close proximity of the lateral side of the tension pulley.

The cap is formed mainly of synthetic resin and fixed together with the guard plate to a pulley plate at the guard plate side. The gap between the lateral side of the tension pulley and the front edge of the guard plate is closed and the lateral side of the tension pulley is covered. Hence, the spokes of the rear wheel are guided by way of the outer surface of the guard plate and do not enter the aforesaid gap. Therefore, the cap prevents the breakdown of the spoke or the bicycle falling from an emergency braking on the the rear wheel when the spoke enters the aforesaid gap. In addition, the guard plate is provided corresponding to each pulley, so that in this invention, a first guard plate corresponds to the tension pulley and a second guard plate to the guide pulley.

These and other objects of the invention will be seen by reference to the description, taken in connection with the accompanying drawings, in which:

BRIEF DESCRIPTION OF THE DRAWINGS

FIG. 1 is a rear view of an embodiment of a rear derailleur of the invention,

FIG. 2 is a sectional view taken on the line II—II in FIG. 1,

FIG. 3 is a view explanatory of a principal portion only of a modified embodiment of the invention, and FIG. 4 is a sectional view taken on the line IV—IV in FIG. 3.

DETAILED DESCRIPTION OF THE INVENTION

A rear derailleur shown in FIG. 1 uses a linkage mechanism of a pantograph type and comprises; a bracket member 1 fixed to the bicycle frame; a fork end of a back fork (not shown); a main body A comprising a base member 2 supported to the bracket member 1, and a movable member 4 coupled with the base member 2 through two parallel links 3. A changeover frame B comprising a pulley plate 6 is supported swingably to the movable member 4 through a pivot shaft 5, and a guide pulley 9 and a tension pulley 10 are supported rotatably to the pulley plate 6 through pulley shafts 7 and 8 respectively. The changeover frame B is biased in one direction with respect to the derailleur body A through a tension spring (not shown) supported to the pivot shaft 5. The tension spring exerts tension on a driving chain C carried by the tension pulley 10.

The pulleys 9 and 10 comprise main bodies 9a and 10a about equal in thickness to the chain C, and teeth 9b and 10b smaller in thickness than the main bodies 9a and 10a respectively. Shaft bores, as shown in FIG. 2, are formed at the centers of bodies 9a and 10a and fitted onto collars 11 screwed with pulleys 7 and 8, so that the pulleys 9 and 10 are supported rotatably to the pulley plate 6 respectively. The bodies 9a and 10a are mounted each at the center thereof with a pair of dust caps 12 and 13.

The derailleur body A is mounted on the fork end through the bracket member 1 axially outwardly of the multi-stage sprockets (not shown) at the rear hub (not shown) of the bicycle. The changeover frame B carries the chain C with guide pulley 9 and tension pulley 10, and moves together with movable member 4 axially inwardly of the rear wheel against a return spring (not shown) by a pull of a control wire (not shown), and conversely, axially outwardly of the rear wheel by restoration of the return spring, thereby switching the chain C to a desired one of the multi-stage sprockets.

A derailleur of such construction is well-known, which is provided with first and second guard plates 14 and 15 corresponding to pulleys 9 and 10 respectively for preventing the chain C from escaping therefrom, and a pulley cap 16 is interposed between the tension pulley 10 and the first guard plate 14 corresponding thereto.

The first guard plate 14 covers a rear side portion of tension pulley 10 with respect to the forward rotation direction of the rear wheel; that is, with respect to the forward movement direction of the bicycle. Teeth 10b positioned at the rear side portion are in mesh with the chain C. The front edge of first guard plate 14 in the same direction is positioned radially inwardly from teeth at the outer periphery of tension pulley 10 and close to the center thereof. Also, the first guard plate 14, as shown in FIG. 2, is fixed onto the pulley shaft 8 at a regular interval with respect to the pulley plate 6.

The second guard plate 15 covers a front side portion of guide pulley 9 with respect to the forward rotation direction of the rear wheel; that is with respect to the forward movement direction of the bicycle. Teeth 9b positioned at the front side portion are in mesh with the chain C. The second guard plate 15 may be integral with the pulley plate 6 or may, as shown in FIG. 1, be pivoted to the pulley plate 6 through a pin 17 so as to be fixed in position for guarding the guide pulley 9. Alternatively, the first and second guide plates 14 and 15 may be integral with each other and fixed to the pulley plate 6 through the pulley shafts 7 and 8.

The pulley cap 16, as shown in FIG. 2, is separate from dust cap 13 covering the boss of tension pulley 10, and is made mainly from synthetic resin and preferably formed into an elastically deformable dish-like shape.

In greater detail, the pulley cap 16 comprises a flat portion 16a having a through bore into which the pulley shaft 8 is inserted and an extension 16b extending from the front edge of first guide plate 14 radially outwardly of tension pulley 10 and then bending along the lateral side thereof, the extension 16b being positioned at the utmost end close to the outer periphery of tension pulley 10.

The cap 16 together with the first guard plate 14 is fixed to the pulley plate 6, and the flat portion 16a is inserted onto pulley shaft 8 through the through-bore and a nut 18 is tightened, so that the pulley cap 16 together with dust cap 13 is brought into press-contact with collar 11, thereby being fixed to pulley plate 6.

In addition in FIG. 2, pulley caps 16 are interposed at both axial sides of tension pulley 10. Alternatively, the cap 16 between the tension pulley 10 and the pulley plate 6 may be omitted.

It is preferable to connect the first guard plate 14 with pulley cap 16 through the outer surfaces thereof. This connection prevents spokes of the rear wheel from interfering with the front edge of first guard plate 14, whereby the spokes are guided smoothly from the outer surface of cap 16 to the outer surface of first guard plate 14.

For that purpose, the first guard plate 14, as shown in FIG. 2, may be provided at the the front side with a guide face 14a of a circular arc in continuation of the extension 16b of cap 16. Alternatively, the cap 16, as shown in FIG. 4, may have a rising portion 16c to cover the front end surface of first guard plate 14, and the extension 16b in continuation of the rising portion 16c may be so disposed that the outer surface of extension 16b is axially leveled with or axially beyond the outer surface of first guard plate 14.

The rear derailleur of the invention constructed as foregoing ensures that the chain C, when switched to a desired sprocket, is guided axially of the sprocket through pulleys 9 and 10 and prevented from escaping therefrom by the pulley plate 6 and guard plates 14 and 15.

In a case where pulley plate 6 carrying pulleys 9 and 10 is moved axially inwardly of the rear wheel to switch the chain C to the low speed sprocket, and a shift-adjusting device is set in a condition of over-shifting toward the low speed sprocket side, or the fork end of the bicycle frame is deformed axially inwardly of the rear wheel due to an accident like the bicycle falling, the tension pulley 10 inevitably enters within the path of rotating spokes, at which time the spokes are kicked axially inwardly of the rear wheel through the guide face 14a of a circular arc in continuation of extension 16b, at the first guard plate 14. Therefore, there is no concern that the spokes will be caught between the tension pulley 10 and the guard plate 14 to thereby cause damage at the spokes, guard plate, or derailleur body, or apply an emergency braking on the rear wheel causing the bicycle to fall.

Alternatively, the pulley cap 16 may be integral with the dust cap 13 or in lieu of the dust cap 13.

Also, it is sufficient to have the utmost end of extension 16b at pulley cap 16 positioned close to the lateral side of tension pulley 10 beyond the outer surface of chain C, but it need not contact the lateral side of tension pulley 10.

While a preferred embodiment of the invention has been described using specific terms, such description is for illustrative purpose only, and it is to be understood that changes and variations may be made without departing from the spirit or scope of the following claims.

What is claimed is:

1. A rear derailleur for switching a driving chain of a bicycle to a desired one of a plurality of sprockets provided at a rear wheel of a bicycle comprising: a main body having a base member and a movable member movable axially of said sprockets with respect to said base member; and a changeover frame which is provided with a pulley plate supported swingably to said movable member, and a guide pulley and a tension pulley supported rotatably to said pulley plate, said changeover frame having first and second guard plates which prevent said chain from escaping from meshing with each of said pulleys, said first guard plate, which prevents said chain from escaping from meshing with said tension pulley, being positioned at a front edge in a forward movement direction of said bicycle, radially inwardly from the outer periphery of said tension pulley and first guard plate having interposed therebetween a pulley cap covering a lateral side of said tension pulley, said pulley cap having an extension extending radially outwardly of said tension pulley from the front edge of said first guard plate and then extending toward the lateral side of said tension pulley, said extension being positioned at the utmost end thereof in proximity to said tension pulley.

2. A rear derailleur for a bicycle according to claim 1, wherein said cap together with said first guard plate is fixed to said pulley plate at said changeover frame.

3. A rear derailleur for a bicycle according to claim 1, wherein said first guard plate has at a front side thereof in a direction of forward bicycle movement a guide face in continuation with the outer surface of said pulley cap.

4. A rear derailleur for a bicycle according to claim 1, wherein said first guard plate is covered at a front side surface thereof in a direction of forward bicycle movement with said pulley cap, said cap having the outer surface axially extending to at least the outer surface of said tension pulley.

5. A rear derailleur for a bicycle according to claim 1, wherein said pulley cap is made from synthetic resin and formed in an elastically deformable dish-like shape.

* * * * *